United States Patent [19]

Campbell

[11] Patent Number: 4,850,034
[45] Date of Patent: Jul. 18, 1989

[54] METHOD AND APPARATUS FOR INSTALLING A CELLULAR TELEPHONE IN A VEHICLE

[76] Inventor: Mark E. Campbell, 783 Bungalow S.W., Grand Rapids, Mich. 49509

[21] Appl. No.: 112,071

[22] Filed: Oct. 26, 1987

Related U.S. Application Data

[62] Division of Ser. No. 90,125, Aug. 27, 1987, abandoned.

[51] Int. Cl.⁴ .................................................. H04B 1/40
[52] U.S. Cl. .................................... 455/74; 343/715
[58] Field of Search .............. 455/74, 83, 82, 345, 455/280; 343/715, 722, 724, 900; 379/59, 60

[56] References Cited

U.S. PATENT DOCUMENTS

| | | | |
|---|---|---|---|
| 3,259,901 | 7/1966 | Bykerk | 343/749 |
| 3,725,942 | 4/1973 | Ukmar | 343/715 |
| 4,037,177 | 7/1977 | Tyrey | 455/74 |
| 4,095,229 | 6/1978 | Elliott | 343/715 |
| 4,106,025 | 8/1978 | Katz | 343/715 |
| 4,141,016 | 2/1979 | Nelson | 343/858 |
| 4,145,693 | 3/1979 | Fenwick | 343/722 |
| 4,200,874 | 4/1980 | Harada | 343/715 |
| 4,210,914 | 7/1980 | Blackman | 343/715 |
| 4,223,314 | 9/1980 | Tyrey et al. | 343/715 |
| 4,439,772 | 3/1984 | Van Kol | 343/749 |
| 4,506,266 | 3/1985 | Mizuno et al. | 343/715 |
| 4,675,687 | 6/1987 | Elliott | 343/715 |

*Primary Examiner*—Robert L. Griffin
*Assistant Examiner*—Curtis Kuntz
*Attorney, Agent, or Firm*—Price, Heneveld, Cooper, DeWitt & Litton

[57] ABSTRACT

A method for installing a cellular telephone transceiver in a vehicle having an existing FM receiver and matching quarter-length monopole antenna comprises connecting the cellular telephone to the existing antenna. The connection between the existing antenna and receiver may be broken and an adapter provided. The purpose of the adapter is to connect the antenna to a junction, to insert a low-pass filter between the existing receiver and the junction and to insert a high-pass filter or impedance matching device between the cellular telephone and the junction. The antenna functions as a two-wavelength monopole for the higher frequence cellular telephone transceiver.

5 Claims, 1 Drawing Sheet

METHOD AND APPARATUS FOR INSTALLING A CELLULAR TELEPHONE IN A VEHICLE

This is a continuation of co-pending application Ser. No. 07/090,125 filed on Aug. 27, 1987.

BACKGROUND OF THE INVENTION

This invention relates to a method and apparatus for installing a cellular telephone in a vehicle such as an automobile and in particular to such a method and apparatus that avoids outward visual indications of a cellular telephone in the vehicle.

A vexatious problem with the use of two-way mobile communication equipment, such as citizen band transceivers and cellular telephones, installed in vehicles such as automobiles, is the need for a special-purpose antenna that externally indicates the presence of expensive equipment in the vehicle and thus increases the risk of theft. Such a specialized antenna is provided because the two-way mobile communication equipment operates in a distinctly different frequency band from the FM receiver and antenna design is strongly dependent on the frequency band of the signal being transmitted and/or received.

The desirability of disguising the existence of mobile communication equipment in a vehicle is well recognized in the art and extensive efforts have been put forth to eliminate antennas that are special-purpose in appearance. One common approach is to provide an adapter circuit to allow a citizens band (CB) tranceiver, as well as the FM broadcast receiver (radio) to utilize the existing antenna for the FM receiver. Because a CB transceiver operates in the 27 MHz band, which is lower than the 88-108 MHz band of the FM receiver, a loading coil is provided in the leg of a three-leg adapter extending to the CB transceiver. The loading coil is provided to increase the effective length of the antenna, as viewed by the CB transceiver, while the path from the antenna to the FM receiver is substantially unaffected. Such an approach is disclosed in U.S. Pat. No. 3,259,901 to R. O. Bykerk.

A second approach to disguising the existence of a CB transceiver is to replace the existing FM receiver stick antenna with a special-purpose antenna which has the appearance of an FM radio antenna, but in fact, has structure that facilitates optimum operation with both the radio and the two-way mobile communication equipment. Such devices, however, are expensive and impractical for after-market field installation due to extensive labor required to remove the existing radio antenna and install the replacement device. An example of such a device is disclosed in U.S. Pat. No. 4,506,266 issued to Mizuno et al., in which a specialized antenna has a control system that responds to the position of an equipment selector switch to adjust the length of the antenna by motor means in order to have a capture-length equal to one-quarter wavelength of the signal frequency of the equipment being operated.

A cellular telephone is a special type of mobile communication transmitter/receiver (transceiver) that communicates with the geographically closest one of a series of interface cells or stationary transceivers which are spaced approximately 20 miles apart in a grid and interconnected with the telephone network. In contrast to a citizens band transceiver, which operates at a frequency lower than an FM radio, a cellular telephone operates at a frequency substantially higher than an FM radio. Therefore, techniques for adapting a CB transceiver to an existing vehicle radio system are ineffective in adapting a cellular telephone to a vehicle because there are no known means for shortening the effective length of an antenna to provide a quarter-wavelength antenna capture-length for the cellular telephone.

A need for an effective means to eliminate outward visual indications of the existence of the cellular telephone is all the greater because a cellular telephone is significantly more expensive than a citizens band transceiver. The average cost of a celelular telephone is $650–$950 and may range as high as $1900. A specialized multiband antenna has been proposed in U.S. Pat. No. 4,675,687 to James Elliott for use with an FM radio and a cellular telephone. The Elliott antenna is, however, too costly for after-market installation for reasons previously stated. Thus, the need for means that can be used with field-installed equipment for eliminating the separate cellular telephone antenna has not been met.

SUMMARY OF THE INVENTION

According to the invention, a cellular telephone is installed in a vehicle having an existing FM broadcast receiver and an antenna with a quarter-wavelength capture-length for FM signals, by using the existing antenna as a multiple-wavelength antenna for the cellular telephone. The cellular telelphone may be installed electrically, merely by breaking the connection between the broadcast receiver and the antenna and by joining the receiver and the cellular telephone to the antenna at a junction. It has been discovered that the cellular telephone may function suitably with the existing automotive antenna even though the optimum quarter-wavelength capture-length antenna for a cellular telephone is much shorter than the capture-length of an existing FM radio antenna. This is believed to be possible because the performance of the transceiver is not significantly penalized by use with an antenna that is substantially longer than a wavelength of a signal in the frequency band of the transceiver, contrary to the distinct degrading that occurs when a transceiver is used with an antenna that is much shorter than a quarter-wavelength of a signal in its frequency band. Further, in contrast to a CB transceiver where optimum performance is always desirable in order to communicate as far away as possible, a cellular telephone need only provide sufficient transmitting power and receiving sensitivity to communicate with a base station that is never more than ten miles from the mobile transceiver.

The cellular telephone may be interconnected with the existing FM receiver by an adapter having a junction, a low-pass filter connecting the junction to the FM receiver and means for connecting the antenna and the cellular telephone to the junction. The leg of the adapter from the cellular telephone to the junction may have a series high-pass filter therein to prevent microphone switching transients, which have a low frequency spectrum, from coupling to the FM receiver. In addtion, an impedance matching device in the leg between the junction and the cellular telephone may be provided to ensure compatability with various existing radio systems. However, no device to adjust the effective length of the antenna is provided. The low-pass filter between the junction and the FM receiver is provided to prevent the relatively high power transmissions of the cellular telephone from coupling to the receiver.

The primary advantage of the invention is that it allows the use of a cellular telephone or the like in a vehicle with no outward visual indications of its presence in the vehicle. In addition, the invention provides a method and apparatus for after-market field installation of a cellular telephone in a vehicle that significantly reduces the labor, and therefore the total cost. In addition, the invention does not require expensive components. These and other related objects, advantages and features of this invention will become apparent upon review of the following specification in conjunction with the drawings.

DESCRIPTION OF THE PREFERRED EMBODIMENT

Figure 1:
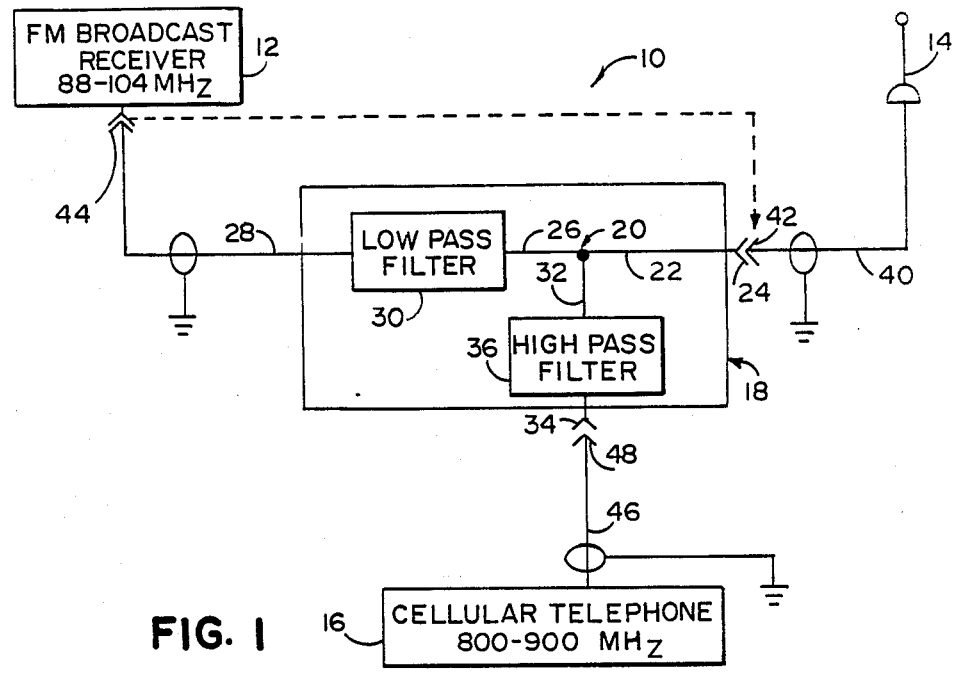
FIG. 1 is a schematic block diagram of one embodiment of the invention.

Referring now specifically to the drawings, and the illustrated embodiments depicted therein, a mobile communication system generally shown at 10, includes a broadcast receiver 12 which typically may be an FM radio receiver capable of receiving signals in the band of 88–108 MHz, a monopole stick antenna 14 and a cellular telephone transnceiver 16 which both transmits and receives signals in the band of approximately 800–900 MHz. Radio 12, antenna 14 and transceiver 16 are interconnected by an adapter 18.

Adapter 18 has a junction 20 having a first leg 22 connected to a connector 24, a second leg 26, including low-pass filter 30 and a coaxial cable 28 terminated with a connector 44, and a third leg 32 including a high-pass filter 36 connected to a connector 34. Connector 34 is selected to interconnect with connector 42 on cable 40, which typically will be the factory-installed coaxial cable from antenna 14 to receiver 12. Connector 44 is selected to interconnect with the antenna-input of the radio. Connector 34 is selected to interconnect with a connector 48 on the terminal end of coaxial cable 46 extending from cellular telephone 16. The end of cable 46 opposite connector 48 may be hard-wired to the cellular telephone or may connect thereto through a connector (not shown).

Low-pass filter 30 has a cross-over frequency at approximately 150 MHz and provides very low insertion loss to signals in the FM radio band to allow their unobstructed passage to the radio. However, filter 30 serves as a virtual open circuit for frequencies in the cellular telephone band to prevent damage to the radio receiver from the relatively high-power transmitting signal from the cellular telephone. High-pass filter 36 has a cross-over frequency at about 600 MHz. Filter 36 will provide very low insertion loss for signals transmitted and received in the cellular telephone band but will prevent low frequency transients that accompany switching of the microphone and other transients from entering the sensitive circuits in the radio receiver.

The standard monopole stick antenna 14 provided with an FM radio in a vehicle has a capture-length of approximately 24 inches. This corresponds to one-quarter wavelength of a signal in the FM band. A quarter-wavelength antenna for a cellular telephone, such as one provided with field-installed units, has a capture-length of approximately three (inches), or an eighth of that of an FM radio antenna. Therefore, an FM radio antenna used with a cellular telephone has a capture-length of approximately two wavelengths at the cellular telephone signal frequencies. It has been surprisingly discovered that a cellular telephone transceiver operates very effectively with such a 2-wavelength monopole antenna. Any degradation of performance resulting from the use of such a 2-wavelength antenna is compensated for by the fact that a cellular telephone is never more than ten (10) miles from a cell in the grid and is capable of clear transmissison/reception over this distance.

To install a cellular telephone according to the method of the invention, adapter 18 is mounted in a convenient location such as under the dash. Connector 42 is removed from the input to radio 12 and is connected to connector 24 on adapter 18. Connector 44, on cable 28 leading from adapter 18, is connected with the jack in the radio receiver left vacant by the removal of the connector from the antenna. Connector 48 on cable 46 leading from the cellular telephone power unit is connected to conector 34.

Figure 2:
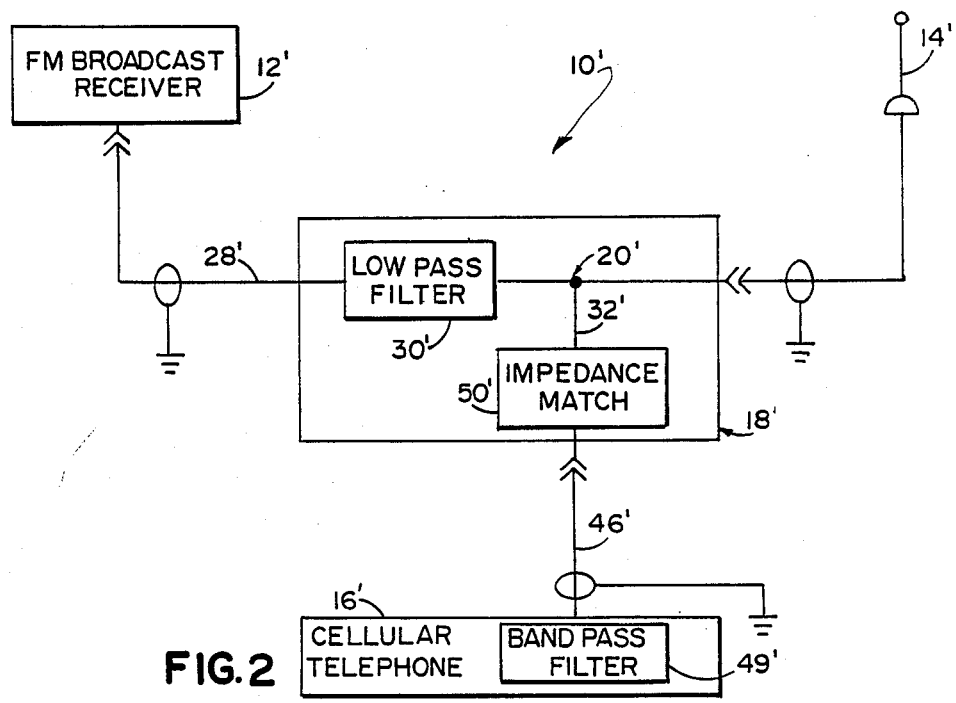
FIG. 2 is a schematic block diagram of a second embodiment of the invention.

In an alternative, preferred embodiment shown in FIG. 2, adapter 18' has a low-pass filter 30' in the leg from junction 20' to the radio but does not have a high-pass filter in leg from junction 20' to cellular telephone 16'. No high-pass filter is provided because commercially available cellular telelphones have an internal high-pass or band-pass filter 49' to filter-out microphone noise and the like while passing and receiving signals in the cellular telelphone band. In this embodiment an impedance matching device 50' is inserted in the leg 32' between junction 20' and telephone 16' and has a first port connected to the telephone and a second port connected to the junction. The purpose of device 50' is to ensure optimum performance of various cellular telephone models with various vehicle radio systems regardless of the type of coaxial cable and line impedance in the existing radio system. Impedance matching devices are well-known and one such device is a balun transformer sold by Channel Master under Model No. 7982. In the preferred embodiment, cables 46' and 28' are type RG6 coaxial cable.

Changes and modifications in the specifically described embodiments can be carried out without departing from the principles of the invention. For example, it is possible to eliminate low-pass filter 30, which is illustratively provided to protect the FM receiver, because most commercially available FM receivers are provided with internal clipping circuits to prevent spurious noise from damaging the radio. Further, although broadcast receiver 12 is illusrated as an FM receiver, it is understood that most such units additionally receive AM broadcast signals at much lower frequencies using the same antenna that is optimally sized for the FM receiver. It is recognized in the art that AM reception is adequate notwithstanding the use of an antenna shorter than one-quarter wavelength. The invention, however, is intended to be limited only by the scope of the appended claims.

The embodiments of the invention in which an exclusive property or provilege is claimed are defined as follows.

1. A cellular telephone communications system installed in a vehicle for receiving FM broadcast signals and for transmitting telephone signals to and receiving telephone signals from a cell positioned within a predetermined distance from said vehicle, said system comprising:

an FM broadcast receiver capable of receiving broadcast signals within a first frequency band;

a cellular telephone transceiver operative to transmit and receive signals within a second frequency band;

a monopole stick antenna attached to the vehicle and having a capture-length that is at least one-quarter wavelength of a signal within said first frequency band;

said signals within a second frequency band having frequencies that are at least four times the frequency of said signals within a first frequency band, such that said monopole stick antenna has a capture-length that is greater than one wavelength of signals transmitted and received by said cellular telephone;

connecting means for electrically connecting said antenna to said broadcast receiver and said transceiver such that said antenna receives one-quarter of the wavelength of signals for said FM broadcast receiver and receives and transmits multiple wavelengths of signals for said cellular telephone transceiver; and said connecting means comprising a junction having a first leg in series with said receiver, a second leg in series with said antenna and a third leg in series with said transceiver, said first leg including a low-pass filter between said receiver and said junction, said third leg including electrical conducting means for conducting electrical signals between said transceiver and said antenna without increasing the effective capture-length of said antenna 2. The system in claim 1 in which said first frequency band is approximately 88 to 104 MHz.

3. The system in claim 1 in which said second frequency band is approximately 800-900 MHz.

4. The system in claim 1 further having a high-pass filter in series with said third leg.

5. The system in claim 1 further having an impedance matching device in series with said third leg.

* * * * *